Figure 1:
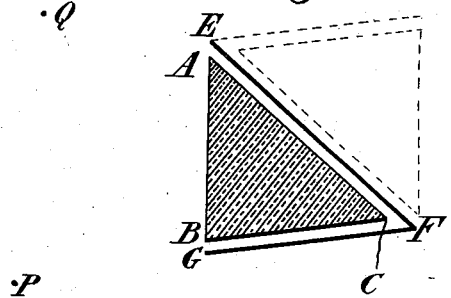

(No Model.)

R. W. WESTERN.
OPTICAL ADVERTISING DEVICE.

No. 540,768. Patented June 11, 1895.

Witnesses:
J. M. Fowler Jr.
Thomas Durant

Inventor:
Richard W. Western.
by Church & Church
his Attorneys.

UNITED STATES PATENT OFFICE.

RICHARD WALSINGHAM WESTERN, OF LONDON, ENGLAND.

OPTICAL ADVERTISING DEVICE.

SPECIFICATION forming part of Letters Patent No. 540,768, dated June 11, 1895.

Application filed April 19, 1895. Serial No. 546,412. (No model.) Patented in England November 7, 1893, No. 21,162.

*To all whom it may concern:*

Be it known that I, RICHARD WALSINGHAM WESTERN, a subject of the Queen of England, residing at London, England, have invented certain new and useful Improvements in Optical Advertising Devices, (for which I have obtained Letters Patent in Great Britain, No. 21,162, dated November 7, 1893,) of which the following is a specification.

This invention relates to an optical device for use in the display of advertisements and the like.

The advertisement according to this invention will in whole or in part appear to alter in color when the beholder makes a certain change in his point of view; or instead of, or in addition to, the alteration of color, the letters, legends, or devices of the advertisement may be altered in whole or in part when the beholder changes his point of view. Upon the alteration or alterations above described I rely, in order to attract the attention of the public to the advertisement in question, and to effect the alteration I avail myself of the phenomenon of "total reflection" as exhibited by optical prisms and explained in text books on the subject of light.

The essential part of my invention is a piece of glass or other suitable transparent substance bounded in front by a single plane surface and bounded behind by one or more plane surfaces the planes whereof are not parallel to the plane of the front of the piece of glass or other substance. The words front and behind as just used and as hereinafter used, apply to the piece of glass or other substance when placed in the position it is intended to occupy as part of the advertisement. Close to the one or more plane surfaces which bound the piece of glass or other substance behind, I place an opaque backing, colored or not colored, on which backing may be the letters, legends, or devices, constituting in whole or in part the advertisement to which it is desired to attract the attention of the public. When the piece of glass or other substance together with the backing described, occupies its position as an advertisement or part of an advertisement, it will be found that from certain points of view the letters, legends, or devices or parts of these in juxtaposition with a plane surface bounding the piece of glass behind, will be directly visible. From certain other points of view these letters, legends or devices situated behind the same plane surface will not be visible, but owing to internal reflection, or as it is called, total reflection, taking place, something else will be seen instead.

In order that my invention and the manner of carrying it into practice may be well understood I will now describe it with reference to the accompanying drawings.

Figure 1 is a diagram representing a cross section of a piece of glass such as hereinbefore described as constituting the essential part of my invention and the juxtaposed opaque backing therefor. The piece of glass must be considered as occupying its place in the advertisement device. A B represent the plane surface which forms the front of the piece of glass, and A C and B C the two plane surfaces which constitute its posterior boundary. E F G represent the opaque backing upon which are marked the letters, legends or devices or parts of these which are desired to make up or to enter into the advertisement. At the point marked P in the figure, an observer looking toward the front A B of the advertisement; will see the part E F of the backing, but on changing his position to the point marked Q in the figure, and again looking toward the front A B, he will no longer see E F, but owing to internal reflection from the plane surface A C he will see the part F G of the backing.

Figure 2:
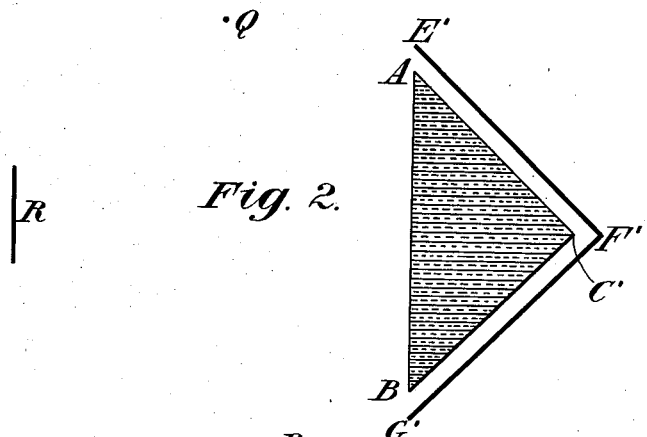

Fig. 2 is a view similar to Fig. 1, of a differently shaped piece of glass. If the part E' F' of the backing be colored blue and the part F' G' be colored red, the observer at P looking toward the front A B will see nothing but blue, since internal reflection taking place at the plane surface C' B, the part F' G' of the backing will be invisible and the part E' F' will be seen instead. Similarly and for a like reason the observer at Q looking toward the front surface A B will see nothing but red. Furthermore, if the angle at C' is approximately a right angle, then the observer at R looking toward A B will see neither blue nor red, since internal reflection will take place from both the posterior surfaces A C' and C' B producing the effect of a mirror.

Figure 3:
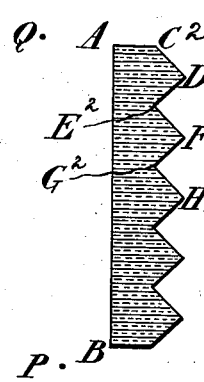

Fig. 3 is a view, similar to Fig. 1, of another specimen piece of glass. A B is the front surface and $C^2 D^2 E^2 F^2$, &c., the posterior surfaces, of which the alternate surfaces are parallel. If the backing in juxtaposition with the parallel surfaces $C^2 D^2$, $E^2 F^2$, $G^2 H^2$, &c., be colored blue, and the backing in juxtaposition with the oppositely disposed parallel surfaces $D^2 E^2$, $F^2 G^2$, &c., be colored red, then on the observer changing his point of view from P to Q the same effects will be produced as in the previous example.

By the use of pieces of glass of the kind shown in Fig. 3 a considerable reduction of weight is effected as compared with the use of a number of pieces of glass such as shown in Fig. 2 arranged with their front surfaces contiguous so as to form a continuous plane surface. If for the purpose of further reducing the weight of glass or for other reasons, it is found desirable, the pieces of glass may be made hollow and their interiors filled with some other transparent material or with transparent liquid or jelly substance.

It will be obvious that for the purpose of forming advertising and such like notices which present different appearances from different points of view the pieces of glass and the opaque backing therefor such as herein described may be arranged or disposed in a variety of ways. One construction which is convenient for a portable device for advertising, consists of two of such devices as are shown in Fig. 1, combined by being secured back to back, i. e., as indicated in dotted lines in said figure with their backings E F superposed and with their transparent faces presented at two diametrically opposite sides of the device.

I claim—

1. In an optical advertising device the combination with a series of transparent prisms of a series of record bearing backings in such juxtaposition with certain of the sides of the several prisms that the records can be viewed through the parts of the prisms which are not backed directly and also by reflection substantially as set forth.

2. In an optical advertising device the combination with a transparent prism of record bearing backings in such juxtaposition with certain of the sides of the prism that the records can be viewed through an unbacked part of the prism directly and also by reflection substantially as set forth.

3. In an optical advertising device a three-sided prism with two sides provided with a record-bearing backing and situated at such an angle to each other and to the third unbacked side that from one point of view both backings are internally totally reflected and invisible and that from other points of view only one backing can be seen at a time substantially as set forth.

In testimony whereof I have hereto set my hand in the presence of two subscribing witnesses.

RICHARD WALSINGHAM WESTERN.

Witnesses:
HAROLD WADE,
C. ROSE.